Feb. 3, 1970   C. A. MERRILL   3,493,132
FRUIT DELIVERY SYSTEM FOR PICKING MACHINES
Filed July 9, 1968   2 Sheets-Sheet 1
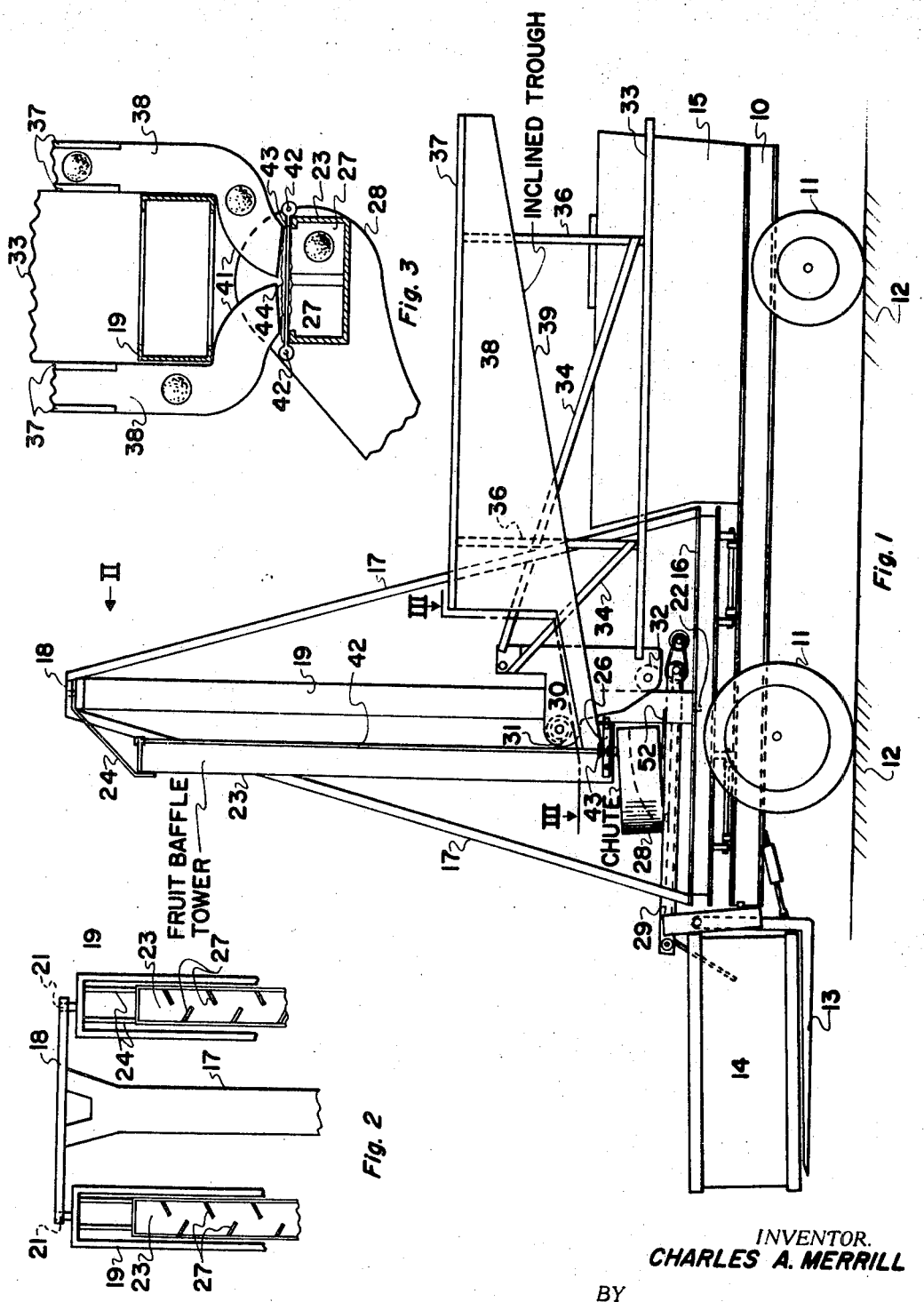
INVENTOR.
CHARLES A. MERRILL
BY
H. W. Brelsford
ATTORNEY

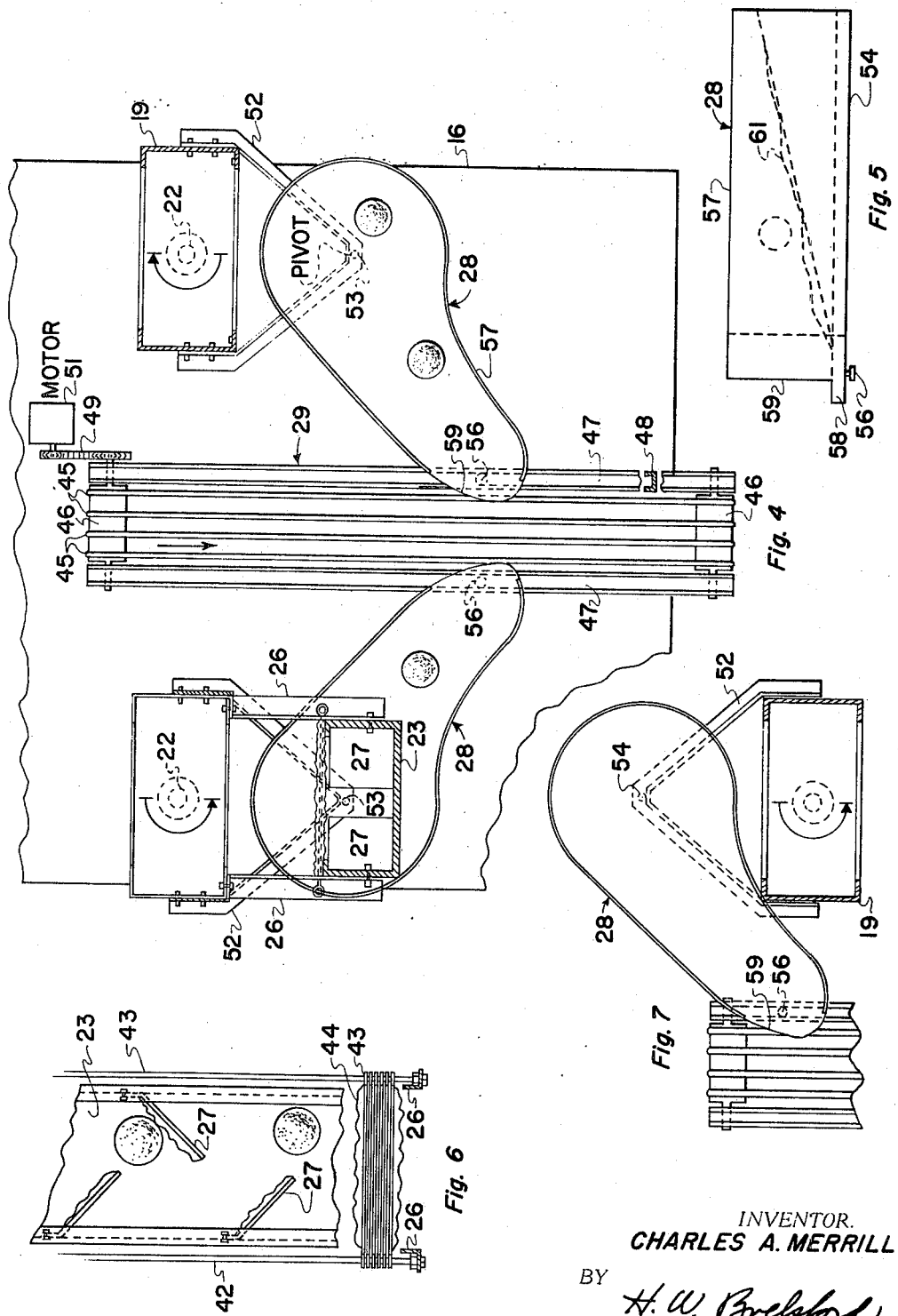

United States Patent Office 3,493,132
Patented Feb. 3, 1970

3,493,132
FRUIT DELIVERY SYSTEM FOR PICKING MACHINES
Charles A. Merrill, 5175 Poinsettia Way, Santa Barbara, Calif. 93105
Filed July 9, 1968, Ser. No. 743,403
Int. Cl. B60r 1/00; A01g 19/04; B65g 11/12
U.S. Cl. 214—83.1                     6 Claims

ABSTRACT OF THE DISCLOSURE

This fruit delivery system receives fruit from a human picker and delivers it to a collecting bin and is primarily useful on picking vehicles having a picking platform that is vertically movable on a rotatable column. The system includes an inclined trough at the picking platform, a baffled tower which receives the fruit from the trough, and a chute at the bottom of the tower to direct the fruit to a collecting bin. Preferably, a conveyor will directly receive the fruit from the chute and deliver it to the collecting bin. The vertical baffled tower receives fruit at any selected elevation of the picking platform with its associated inclined trough, and is open at that elevation to the trough, but closed below that elevation by a sliding curtain having the upper end movable upwardly and downwardly by the vertically movable platform. The bottom of the tower delivers fruit to a pivoted chute which automatically positions itself during rotation of the tower to receive the fruit and direct it to the conveyor or bin.

---

This invention relates to picking vehicles having platforms vertically movable on a column and has particular reference to an improved gravity flow delivery system for transporting fruit from the platforms to a collector box on the vehicle.

Picking machines of the general type referred to are disclosed in U.S. Patent 2,614,893 issued Oct. 21, 1952 to W. D. Merrill and C. A. Merrill and entitled Agricultural Scaffold. Such machines are preferably self propelled vehicles that can be moved between rows of orchard trees while pickers standing on independently movable platforms pluck fruit from the trees. The platforms are vertically movable on rotatable columns, and the columns are rotatable, and the platform elevations are changed, by controls operated by the picker on platform. One or more platforms may additionally have vehicle controls to move the picking vehicle from one tree location to another.

The delivery system includes an inclined trough at the platform down which fruit rolls to a vertical tower having baffles to slow the speed of movement under gravity, and the bottom end of the baffled tower discharges the fruit into a chute which delivers the fruit to a conveyor that transports it to a bin. The chute is pivoted to accommodate various rotatable positions of the column and baffled fruit tower.

It is, therefore, a general object of the invention to provide an improved fruit delivery system for picking vehicles having vertically movable platforms mounted on rotatable columns.

Other objects, advantages and features of the invention will be apparent in the following description and claims considered together with the accompanying drawings forming an intergral part of the invention, wherein FIG. 1 is an elevation side view of a vehicle incorporating the invention wherein the picking platforms are rotated to the right.

FIG. 2 is a fragmentary end view of the upper portion of the machine as indicated by the arrow II.

FIG. 3 is a fragmentary top view rotated 90° to the left of a portion of the picking platform close to supporting column, as indicated generally by the section lines III—III.

FIG. 4 is a plan view of the left hand part of the vehicle of FIG. 1 taken at two different elevations on the rotatable columns, the right hand one being taken at the bottom of the fruit delivery tower, and the left being a section through the fruit delivery tower, but with the platforms omitted in both cases.

FIG. 5 is an elevation view of the chute of FIG. 4 which receives fruit at the bottom of the fruit baffle tower.

FIG. 6 is a fragmentary elevation view of the bottom end of one of the fruit delivery columns.

FIG. 7 is a fragmentary plan view similar to the right hand part of FIG. 4 but with the column rotated 180° clockwise.

Referring to FIGS. 1, 2 and 3, there is illustrated a picking vehicle 10 supported by wheels 11 on the ground 12. An engine compartment 15 may house a suitable engine, such as an internal combustion engine which drives a hydraulic pump. Hydraulic fluid may be used accordingly, to steer the vehicle, to rotate the wheels to move it along the ground and to effect all the other mechanical movements hereafter described. Located on the left end of the vehicle, as viewed in FIG. 1, is a fork lift 13 which holds a fruit bin 14. The delivery system to be described delivers fruit from the hand of the human picker to this bin 14.

Mounted on the vehicle 10 is a platform 16 which has diagonal braces 17 secured to the forward and rearward end of the platform to support a cross bar 18, as shown best in FIG. 2. Extending upwardly from the platform or deck 16 to the cross bar 18 are a pair of vertical columns 19 mounted for rotation by trunnions 21 in the cross bar 18 and trunnions 22 in the deck 16. Suitable power means, not illustrated, may be used to independently rotate these columns 19 to any desired position in a 180° arc. Spaced to the left, as viewed in FIG. 1, from each column 19, is a fruit baffle tower 23 held in position by a pair of upper brackets 24 secured to the top of the columns 19. The fruit baffle towers 23 are open on the side facing the column 19 and are open at the bottom and have a plurality of alternating baffles 27, preferably covered with foam rubber or similar material, to slow the downward movement of fruit in the tower to the bottom. Disposed at the bottom of each baffle tower 23 is a chute 28 which receives the fruit from the bottom of the tower and delivers it to a conveyor belt 29, which in turn delivers it to the bin 14.

Referring to FIGS. 1 and 3, each vertical column 19 is preferably formed of a box construction for greatest strength, and there is illustrated channel members welded together in the form of a rectangular open frame. Mounted on each column 19 is a vertically moving carriage 30 having an upper roller 31 and a lower roller 32 to reduce friction. Suitable power means (not illustrated) are used to move each carriage 30 independently upwardly or downwardly on its respective column 19. Secured to the carriage 30 is a platform 33 having diagonal braces 34 and vertical posts 36 which support an upper hand rail 37 disposed on each side of the platform 33. Each hand rail 37 is split and a trough 38 is suspended from each half of the hand rail 37 and has an inclined bottom 39. A human picker standing on the platform 33 plucks fruit from a tree and deposits it in the trough 38 on either side of the platform 33, and the fruit rolls down the inclined trough 38 to the left, as viewed in FIG. 1. The troughs 38 have portions 41 that bend around the vertical column 19 and act as spouts so that the troughs will deliver fruit to the open face of the fruit baffle tower 23.

Referring now particularly to FIGS. 3 and 6, it will be noted that at each side of the open face of the vertical fruit tower 23, there is a vertical rod 42, and threaded on these rod pairs 42 is a double eyed cross bar 43 which carries a fabric curtain 44. The curtain 44 may be secured to the rods 43 by sewing a strip about each rod 43. Six or more of these cross bars 43 may be used, so that when the curtain is extended the full height of the fruit tower 23, the entire open face of the fruit tower 23 will be closed off by the curtain and the double eyed cross rods 43 which support the curtain 44. The top double eyed rod 43 or the top edge of the curtain 44 may be secured to the underside of the trough spouts 41, so that regardless of the elevation of the platform 33 and the corresponding elevation of the trough 39, the open face of the fruit tower 23 will be open to the fruit spouts 41 and will be open above that level but will be closed off below the level of the fruit spouts 41 so that the fruit tumbling down the vertical fruit tower 23 from baffle to baffle 27 will be held within the tower.

Referring now to FIG. 4, it will be noted that the conveyor 29 may include a pair of end rollers 46 positioned one at each end of a pair of side rails 47, the upper edge of which is in the form of a channel or groove 48. Stretched between the two rollers 46 are a plurality of endless belts 45 which are spaced from each other but with a spacing sufficiently small so that the smallest fruit will be carried between any two conveyor belts 45. One roller 46 may be rotated by means of a gear and chain mechanism 49 actuated by a suitable motor, such as a hydraulic motor 51.

Referring still to FIG. 4, extending from each vertical column 19, is a triangular bracket or brace 52, having a pivot hole 53 formed at the apex. As shown best in FIG. 5, projecting from the bottom of each chute 28, is a pivot pin 54 which fits within the pivot hole 53 in the bracket 52. Also illustrated in FIG. 5 is a downwardly projecting guide pin 56 which may have a roller on the bottom, if desired, and this pin fits within the groove 48 in the side rails 47 of the conveyor 29. It will be noted by reference to the left hand part of FIG. 4, that the pivot hole 53 is disposed approximately underneath the vertical fruit tower 23.

Considering now FIGS. 4, 5 and 7, it will be noted that the chutes 28 have side walls 57 which project upwardly from a bottom plate 58, but these walls are removed in the portion of the chute which overlies the conveyor 29 to define a chute opening 59. As shown best in FIG. 5, each chute has an inclined inner surface 61 formed of foam or other soft resilient material which will cushion the fruit against bruising. The inclined surface 61 directs the fruit from underneath the vertical towers 23 to the conveyor 29.

Comparing now FIGS. 4 and 7, it will be noted that the right hand column 19 has been rotated 180° clockwise from the position of the right hand part of FIG. 4 to the position of FIG. 7. The clockwise rotation of the triangular bracket 52 causes the pivot point 53 to move first toward the conveyor 29 and then, as viewed in FIG. 7, away from the conveyor 29. At the mid-point, or 90° turning position, chute 28 will be roughly aligned with the conveyor 29, but will, nevertheless, deliver fruit to the conveyor because of the location of the chute opening 59. The reason for the pear shaped outline of chute 59 is best illustrated in FIG. 7, because of the necessity of the chute to fit around the vertical column 19 in this farthest rotational position of FIG. 7. Accordingly, as viewed in FIG. 4, the lower surface of each chute 28 is cut out as far as the outline of the chute is concerned to form a general pear shape in plan view. It will be noted further, by viewing the left hand part of FIG. 4, that the large pivoted end portion of chute 28 substantially encircles the entire fruit tower 23 so that there will be positive pick up of fruit discharging from the bottom of the tower regardless of the rotational position of the columns 19 and the associated brackets and fruit tower 23.

Operation

Referring to FIGS. 1 and 2, a human picker is disposed on each of the platforms 33 and one of the platforms may have controls (not shown) for moving the vehicle 10 forward or backward and for stopping and steering it. The two platforms 33 are normally positioned during storage as shown in FIG. 1 to reduce the bulk of the system. When the vehicle is in position between a row of trees, each platform 33 is individually movable in elevation from the bottom position illustrated to the top of the columns 19. Each platform 33 is also individually rotatable by rotation of the columns 19 from the position shown, outwardly of the vehicle 10, to a position 180° where the platforms 33 are to the left of the columns 19, as viewed in FIG. 1. The platform movement controls (not shown) are preferably at the hand railings and bottom edges of the platforms and may be operated by the pickers' hands, also knees or feet.

Referring now to all of the figures, a picker plucks fruit from a tree and deposits it in one of the two troughs 38 disposed one on each side of the platform and the fruit rolls down the inclined trough bottom 39, around the columns 19 to the open face of the vertical baffle tower 23. The fruit then descends by gravity, encountering the baffles 27 (FIG. 6) which slows the descent. The open face of the fruit tower 23 is closed below the trough 38 by the curtain 44 (FIG. 6) supported at intervals by the double eyed cross bars 43 sliding on guide rods 42. When the fruit reaches the bottom of the towers 23, it discharges into the respective chute 28, rolls down the padded inclined chute bottom 61 (FIG. 5) onto the conveyor 29 which transports it to the bin 14.

Inasmuch as each chute is pivoted at 53 under their respective tower 23 and each tower 23 is spaced from the center of rotation 22 of each tower, there is considerable horizontal motion of each chute as the colums 19 rotate. This horizontal movement is accommodated by pivoting one end of the chutes 28 at 53 and guiding the other end by pin 56 fitting in groove 48. The chutes are thereby automatically moved along the length of conveyor 29 from the position shown in FIG. 4 to that shown in FIG. 7.

It will be apparent to those skilled in the art, that various modifications could be made in the invention without departing from the true spirit and scope of the invention. For example, one side only of the vertical column 19 could be open and baffles placed inside to act as a combined column and fruit baffle tower. I have found it mechanically difficult, however, to accommodate a chute to this type of construction, but nevertheless, this could be done. It will be apparent that sliding plates could be used in place of the flexible curtain which I used to close off the open side of the fruit delivery tower. Mechanisms other than baffles could be used to slow up the movement of fruit downwardly through the fruit tower, for example, diverging rods or flexible ropes in a criss cross or any other desired pattern. Further, it will be apparent that a large bin could be substituted for the conveyor 29 so that the chutes 28 discharge directly into a bin. Accordingly, the present invention is not limited to the specific structure shown, and there is shown only the presently preferred embodiment as required by the rules and applicable law.

I claim:

1. A fruit delivery system for picking vehicles having vertically movable platforms rotatable about a vertical axis having fruit receiving means comprising:
   (a) a trough secured to a platform and inclined downwardly toward said vertical axis so that fruit placed in the trough will roll toward the vertical axis;
   (b) a vertical baffled fruit delivery tower disposed adjacent to the vertical axis and open on the side toward the trough to receive the fruit from the trough;

(c) a sliding cover for said open side of the tower having an upper edge connected to the platform to close said open side below the trough at any elevation selected for the platform to enclose the part of the tower delivering fruit;

(d) means establishing a pivot point approximately under said fruit tower;

(e) means establishing a guide adjacent to the fruit receiving means;

(f) and a chute disposed at the bottom of the tower to receive fruit and direct it toward said fruit receiving means, and having one end pivoted to said pivot point and having the other end guided by said guide.

2. A fruit delivery system as set forth in claim 1 wherein the vertical baffled fruit delivery tower is spaced from the vertical axis.

3. A fruit delivery system as set forth in claim 1 wherein the fruit receiving means includes a linear conveyor and a bin, and the guide is adjacent the conveyor.

4. A fruit delivery system as set forth in claim 1 wherein the chute outline is greater in horizontal dimensions than the horizontal dimensions of vertical tower, and the pivot disposes the chute outline around the bottom of the tower.

5. A fruit delivery system as set forth in claim 1 wherein the platform is elongated away from the vertical axis, and there is an inclined trough on each side of the platform and the troughs both feed into the vertical tower.

6. A fruit delivery system as set forth in claim 2 wherein the chute horizontal outline is pear shaped to accommodate the vertical tower when rotated through 180°.

References Cited

UNITED STATES PATENTS

| 2,450,152 | 9/1948 | Miller | 214—83.1 |
| 3,182,827 | 5/1965 | Frost | 214—83.1 |

ALBERT J. MAKAY, Primary Examiner

U.S. Cl. X.R.

193—7